United States Patent [19]

Greenhalgh

[11] 3,881,666
[45] May 6, 1975

[54] WINDING CORE CHUCK
[76] Inventor: Eric Greenhalgh, 40 Red House Ln., Chorley, England
[22] Filed: Sept. 5, 1972
[21] Appl. No.: 286,208

[52] U.S. Cl. ............................... 242/68.2; 242/72.1
[51] Int. Cl. ............................................ B65h 17/02
[58] Field of Search ......... 242/68.2, 72, 72.1; 279/2

[56] References Cited
UNITED STATES PATENTS

| | | | |
|---|---|---|---|
| 2,075,192 | 3/1937 | George | 242/68.2 X |
| 2,291,863 | 8/1942 | Baker | 242/72.1 |
| 3,319,902 | 5/1967 | Stevens | 242/72.1 |
| 3,552,673 | 1/1971 | Evers | 242/72.1 |

*Primary Examiner*—Edward J. McCarthy
*Attorney, Agent, or Firm*—Scrivener Parker Scrivener and Clarke

[57] ABSTRACT

A chuck for supporting a roll core comprising a mounting shaft, a tapered section on the shaft and an expandible sleeve axially displaceable on said shaft. The sleeve has surfaces slidably engageable with the tapered section of the shaft whereby displacement of the sleeve in one direction along the tapered section causes the sleeve to expand and displacement, from an expanded condition, in the other direction causes the sleeve to contract.

12 Claims, 2 Drawing Figures

WINDING CORE CHUCK

This invention relates to chucks and particularly concerns chucks for use with roll cores for winding and unwinding paper and other web materials.

According to the invention a chuck comprises a tapered mounting shaft and an expandable sleeve slidably mounted on the shaft, whereby relative axial movement between the sleeve and the shaft causes variation of the sleeve diameter enabling the chuck to engage a roll core internally or to disengage therefrom.

The sleeve preferably comprises a plurality of segments circumferentially disposed around the shaft. The sleeve is conveniently secured on the shaft by resilient means, e.g. a garter spring, which permits expansion of the sleeve and tends to urge it back inwards into an unexpanded condition. The sleeve preferably has, which may be axial or helical for example, serrations around its outer periphery to assist its firm engagement with the core, and a thrust member designed to engage with the core upon insertion of the chuck into the core whereby the core is caused to bear on the thrust member and thus move the sleeve up the taper on the shaft until the sleeve has thereby expanded sufficiently to engage with the inner surface of the core.

Figure 1:
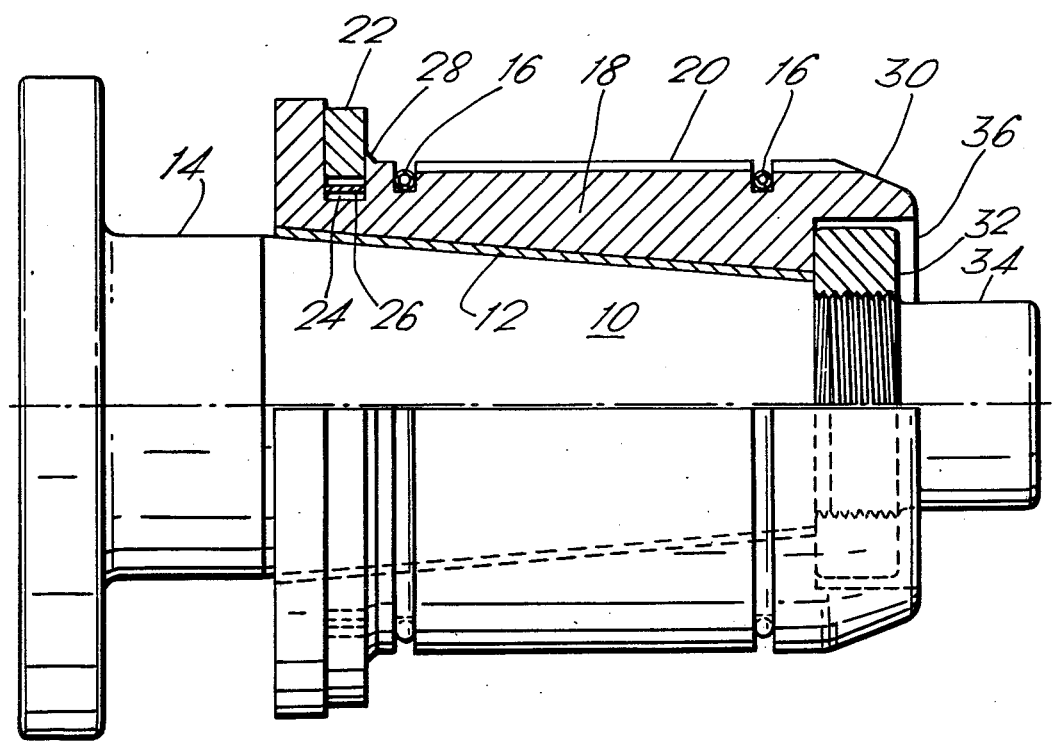
Figure 2:
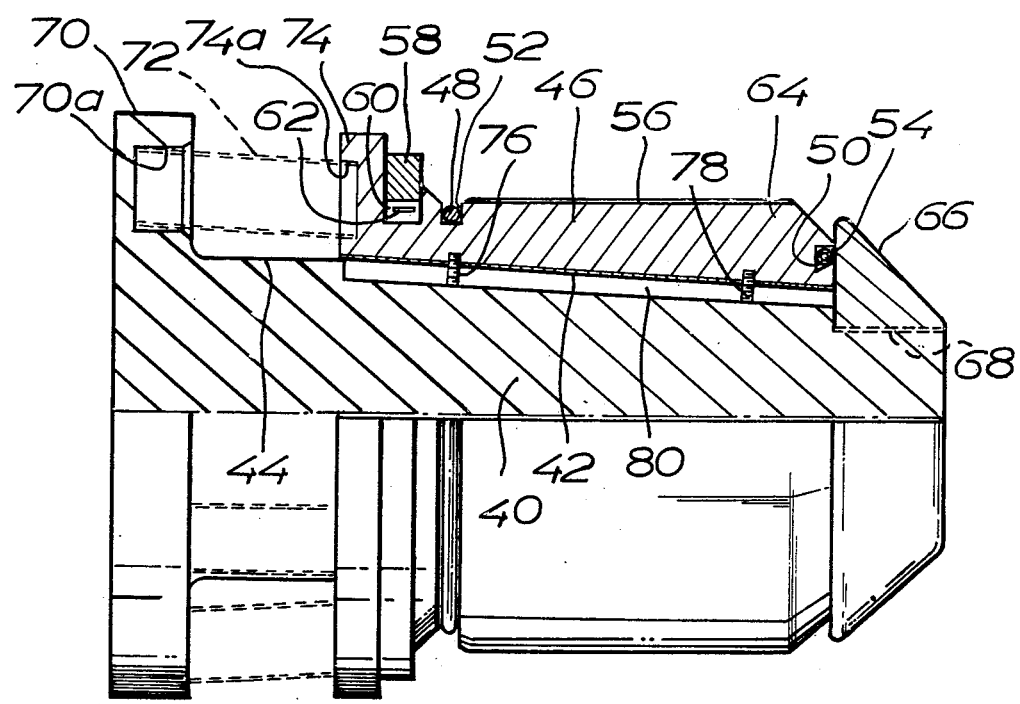

The invention will now be described further by way of example with reference to the accompanying drawing, in which:

FIG. 1 shows a longitudinal section through a chuck in accordance with the invention; and FIG. 2 shows a side view, partially in section, of an alternative embodiment in accordance with the invention.

The chuck shown in FIG. 1 comprises a hexagonal mounting shaft 10 tapered as shown at 12 but left untapered at 14 for ease of fabrication. Expandably secured on the shaft 10 by garter springs 16 are six segments as 18 which together constitute the sleeve and each of which is axially slidable over the adjacent flat on the shaft 10. The combined segments present a circular outer periphery having axially directed serrations 20 which facilitate firm engagement between the sleeve and the inner surface of a core (not shown) and thus inhibit slipping between chuck and core.

The sleeve has a thrust member in the form of a floating thrust ring 22 which is of sufficient internal diameter to accommodate the maximum expansion of the sleeve and is located in a recess 24. In this embodiment a wave spring 26 is interposed between the ring 22 and recess 24 so as to centralise the ring with respect to the shaft 10 thus providing a land of approximately equal height all round the chuck. In front of the thrust ring 22 on the segments is a frusto-conical collar 28 which aids centering of the core as the chuck is inserted into it.

The segments 18 also have front portions 30 defining a frusto-conical configuration to facilitate insertion into the core. The shaft 10 carries a stop collar 32 to limit movement of the sleeve towards the front of the chuck and a stub portion 34 which may be used to centre the core before the rest of the chuck is inserted into it.

When the chuck is not in use, i.e., is not inside the core, its parts rest in the dispositions shown in the drawing. When the chuck is inserted into the core, the core slides loosely over the segments 18 from right to left in the drawing until it engages in abutting relationship with the thrust ring 22. Then, as the chuck is inserted deeper, the core bears on the thrust ring and forces the segments 18 to ride up the taper, which expands them until they firmly engage with the inner surface of the core. The chuck is kept fully inserted while winding or unwinding is carried out. Upon withdrawal of the chuck, the core disengages from the thrust ring and the garter springs 16 urge the segments inwardly and tend to move them back down the taper until they stop against the collar 32. The segments may also be urged back towards the collar 32 by their residual engagement with the core during the first stages of separation or they may be moved by hand if need be.

A stop means may additionally be fitted to prevent axial movement of the sleeve until the core abuts against the thrust ring, i.e., until the circumferential part of the sleeve which is to engage with the inner surface of the core is fully inserted into the core. If such a stop means is not fitted, the performance of the chuck may be impaired if the core, not being properly centered, for example catches on the front end of the sleeve at 36 and moves the sleeve up the taper and thus expands it so that only a portion of the sleeve engages with the inner surface of the core. If that happens and is not corrected, there may be insufficient contact between the serrated sleeve and the core to prevent the serrations chewing out the inner surface of the core.

As a further addition, the return of the sleeve to the front of the chuck may be aided by cam, spring or other means incorporated in or on the shaft.

A chuck having axial serrations as aforesaid embodying the invention may be rotatably driven in both directions, i.e. it is reversible. As an alternative the serrations on the segments may be so aligned as to help expansion of the sleeve when helically disposed and the chuck is driving the core and to aid its collapse on reversing the torque applications. In this instance the chuck would not be reversible.

The mounting shaft may be sheathed with a self lubricating material to assist in reducing friction between the shaft and the sleeve.

In the embodiment illustrated in FIG. 2 a hexagonal mounting shaft 40, tapered as shown at 42 but untapered at 44 for ease of fabrication, has six segments 46 expandably secured thereon by garter springs 48 and 50 located respectively in recesses 52 and 54 formed in the segments 46. The six segments 46 in combination constitute a sleeve having a substantially cylindrical periphery and each segment 46 is axially slidable on a flat tapered surface of the shaft 40. The six segments 46 have axially directed serrations 56 on their external surface to facilitate firm engagement of the segments 46 with the inner surface of a core (not shown) and thus inhibit slipping between the sleeve and the core.

The sleeve includes a thrust member, in the form of a floating thrust ring 58, located in a recess 60 circumscribing the sleeve and the thrust-ring 58 has an internal diameter sufficient to allow the desired maximum expansion of the sleeve. A wave spring 62 located between the bottom of the recess 60 and the bore of thrust-ring 58 retains thrust-ring 58 concentric with the axis of the shaft 40.

As can be seen in FIG. 2 the recesses 52 and 60 lie close together and the flange formed therebetween is higher than the peripheral surface of the assembled segments 46. This flange tapers upwardly to the forward edge of recess 60 to aid centering of the core as the chuck is inserted into the core.

The segments 46 have their forward portions 54 defining a frusto-conical configuration to facilitate insertion of the sleeve into a core and the forward ends of segments 46, abut, in their forward-most position, i.e., at the position of minimum diameter, a frusto-conical nose cone 66 screwed on to a stub portion 68 of shaft 40. The nose cone 66 further facilitates the easy insertion of the sleeve, in its contracted condition, into a core.

The mounting shaft 40 also includes a flange 70 on the rear (left hand side in FIG. 2) of the untapered portion 44 and six coiled compression springs 72 extend between the flange 70 and a flange 74 on the rear portions of the segments 46, said springs 72 being located at their ends in recesses 70a and 74a in the flanges 70 and 74 respectively. The springs 72 are disposed equally spaced about a pitch circle diameter concentric with the axis of the mounting shaft 40.

To eliminate accidental circumferential displacement of the segments 46 relative to the shaft 40 each segment 46 has pins 76 and 78 projecting from its inner surface and engaged in an axially extending keyway 80 cut into the flat surface of the shaft 40 upon which the segment rests.

When the chuck is not in use the coil springs 72 urge the segments 46 into a forward, contracted condition where the forward ends of segments 46 engage the nose cone 66. In this condition the chuck is easily inserted into the bore of a core until the core engages the frusto-conical portion of the segments 46 and abuts the thrust-ring 58 whereby further advance of the chuck causes the thrust-ring 58, and thereby the six segments 46, to be rearwardly displaced along shaft 40, against the restraint exerted by the springs 72 and garter springs 48 and 50 and during rearward displacement the segments 46 ride up the tapered surfaces of mounting shaft 40 and are expanded thereby until the segments 46 firmly engage with the bore of the core.

The limit of rearward displacement of the segments 46 is defined by a fully compressed condition of the springs 72 but as in operation a continuous radial force between the sleeve and the core is necessary for positive drive the chuck should not be used with cores having a bore diameter which will allow the maximum expansion of the sleeve.

Upon withdrawal of the chuck, retraction of the mounting shaft 40 allows the segments 46 to slide down the tapered surfaces of mounting shaft 40 under the force exerted by the compression springs 72 and garter springs 48 and 50. The sleeve is contracted by garter springs 48 and 50 and thus the chuck is readily removed from the core.

To facilitate the sliding movement between the mounting shaft 40 and the segments 46 each segment 46 has a layer or lining of a self lubricating material, in this case nylon, secured to their inner surfaces for sliding engagement with the shaft 40.

I claim:

1. A chuck for supporting a roll core comprising a mounting shaft, a tapered section on said shaft, an expandible sleeve axially displaceable on said shaft and having surfaces slidably engageable with said tapered section, and whereby axial displacement of said sleeve in one direction along said tapered section causes the sleeve to expand and displacement of said sleeve in the opposite direction causes the sleeve to contract, and wherein the expandible sleeve includes a thrust ring separate from but axially restrained with respect to the sleeve, and means for maintaining the thrust ring concentric with said shaft and engageable with the end of a roll core when the chuck is inserted into a roll core, said thrust ring serving to cause displacement of the expandible sleeve up said tapered section as the sleeve and shaft are pushed into the roll core.

2. A chuck according to claim 1 and wherein interengaging parts between said expandible sleeve and said mounting shaft prevent angular displacement therebetween.

3. A chuck according to claim 1 and wherein the leading regions of the expandible sleeve are shaped to facilitate entry of the sleeve into a roll core end.

4. A chuck according to claim 1 and wherein means are provided to resiliently urge the sleeve towards a contracted condition.

5. A chuck according to claim 1 and wherein a nose cone is provided on the shaft to limit the axial displacement of the sleeve towards its contracted condition and said nose cone is shaped to facilitate entry of the chuck into the end of a roll core.

6. A chuck according to claim 1 and wherein said thrust ring is engaged in a recess in said sleeve and said means for maintaining said thrust ring in concentric relationship with said shaft is a wave spring engaged in said recess between said sleeve and said thrust ring, said wave spring serving to urge said thrust member radially outwardly of the axis of the shaft.

7. A chuck according to claim 1 and wherein said means for maintaining said thrust ring in concentric relationship with said shaft is a wave spring engaged in said recess between said sleeve and said thrust ring, said wave spring serving to urge said thrust member radially outwardly of the axis of the shaft.

8. A chuck for supporting a roll core comprising a mounting shaft, a tapered section on said shaft, an expandible sleeve axially displaceable on said shaft, said sleeve comprising a plurality of segments circumferentially disposed around said shaft, each of said segments presenting a surface for sliding engagement with said tapered section, whereby axial displacement of said sleeve relative to said shaft in one direction causes the sliding surfaces of said segments to slide up the tapered section of the shaft to expand the sleeve and displacement of the sleeve in the other direction from an expanded condition allows the sliding surfaces to slide down the tapered section to contract the sleeve, and wherein a thrust ring is engaged in a recess in the sleeve and means are provided for maintaining said thrust ring concentric with said shaft, said thrust ring being engageable with the end of a roll core, upon entry of the chuck into the core, to cause displacement of the sleeve relative to the shaft as the shaft is further inserted into the roll core.

9. A chuck according to claim 8 and wherein said segments present flat surfaces for sliding engagement with flat surfaces of said tapered section.

10. A chuck according to claim 8 and wherein a layer of self lubricating material is disposed between each segment and said shaft.

11. A chuck according to claim 8 and wherein a circumferential resilient restraint is provided for retaining the segments on the shaft and to urge the segments into a contracted condition for the sleeve.

12. A chuck according to claim 8 and wherein a nose cone is secured on the shaft adjacent the narrow end of said tapered section, said nose cone is shaped to facilitate entry of the chuck into the roll core and means are provided for limiting the axial displacement of the segments relative to the shaft in the direction of contraction of the sleeve.

* * * * *